(12) United States Patent
Mahony et al.

(10) Patent No.: US 11,748,392 B1
(45) Date of Patent: Sep. 5, 2023

(54) SYSTEMS AND METHODS FOR SUBSTANTIALLY REAL-TIME ADAPTIVE REPORT GENERATION

(71) Applicant: N. Harris Computer Corporation, Ottawa (CA)

(72) Inventors: Joseph Mahony, Peterborough (CA); Timothy J. Berson, Camas, WA (US); Michael Ferri, Saint Peters Harbour (CA); Martin Cathrae, Saint Peters Harbour (CA)

(*) Notice: Subject to any disclaimer, the term of this patent is extended or adjusted under 35 U.S.C. 154(b) by 0 days.

(21) Appl. No.: 17/958,195

(22) Filed: Sep. 30, 2022

(51) Int. Cl.
| | | |
|---|---|---|
| G06F 17/30 | (2006.01) |
| G06F 16/33 | (2019.01) |
| G06F 16/332 | (2019.01) |
| G06F 16/632 | (2019.01) |
| G06F 16/638 | (2019.01) |

(52) U.S. Cl.
CPC ...... *G06F 16/3344* (2019.01); *G06F 16/3329* (2019.01); *G06F 16/632* (2019.01); *G06F 16/638* (2019.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS

| | | | | |
|---|---|---|---|---|
| 10,657,125 | B1* | 5/2020 | Gautam | G06F 16/24522 |
| 2004/0078364 | A1* | 4/2004 | Ripley | G06F 16/284 |
| 2016/0188819 | A1* | 6/2016 | Subramanian | G06Q 10/10 705/4 |
| 2017/0118094 | A1* | 4/2017 | Rao | H04L 63/083 |

(Continued)

FOREIGN PATENT DOCUMENTS

CN 113779062 12/2021

OTHER PUBLICATIONS

"Speak to your Parser: Interactive Text-to-SQL with Natural Language Feedback" by Microsoft. https://www.microsoft.com/en-us/research/publication/speak-to-your-parser-interactive-text-to-sql-with-natural-language-feedback/.

(Continued)

*Primary Examiner* — Hung D Le
(74) *Attorney, Agent, or Firm* — Camille A. Wilson; Wilson Dutra, PLLC

(57) ABSTRACT

The present disclosure provides for systems and methods for substantially real-time adaptive report generation. An adaptive report system may comprise at least one query. The adaptive report system may comprise at least one voice control component. The adaptive report system may comprise at least one report. The adaptive report system may comprise one or more verifications. The adaptive report system may comprise at least one natural language processor.

The adaptive report system may comprise at least one translated query. The adaptive report system may comprise at least one database query. The adaptive report system may comprise at least one database. When the at least one query at least partially comprises at least one audio signal, the at least one voice control component may convert the audio signal to text. When the at least one query has not been previously submitted, the adaptive report system may store one or more verification metrics as training data to improve the accuracy of future report generation.

15 Claims, 9 Drawing Sheets

(56) References Cited

U.S. PATENT DOCUMENTS

| | | | |
|---|---|---|---|
| 2017/0161826 A1* | 6/2017 | Packer | G06Q 40/03 |
| 2020/0090287 A1* | 3/2020 | Haldane | G06F 40/174 |
| 2021/0082553 A1* | 3/2021 | Attili | G16H 50/30 |
| 2022/0067104 A1 | 3/2022 | Prakash et al. | |
| 2022/0129851 A1* | 4/2022 | Mishra | G06Q 10/10 |
| 2022/0199229 A1* | 6/2022 | Holmes | G16H 30/20 |

OTHER PUBLICATIONS

"Making the Case for Query-by-Voice with EchoQuery" by ACM. https://dl.acm.org/doi/10.1145/2882903.2899394.

* cited by examiner

SYSTEMS AND METHODS FOR SUBSTANTIALLY REAL-TIME ADAPTIVE REPORT GENERATION

BACKGROUND

Within any economy, trade and commerce have always dictated the direction of the relevant economic market. Any company or organization desiring to participate and profit from economic commerce has to effectively, and quickly, form relationships with other companies and organizations that provide the materials needed to produce a marketable good or provide a useful service. Whether the goods or services include tangible products, valuable information, or useful expertise, supply chain demands within a market form the foundation for companies across different markets and niches to work together.

One initial step in forming these supply chain relationships is obtaining quotes and information from potential vendors or providers to assess which of the available options will be the best fit for a company's or customer's needs. Unfortunately, this information, whether it includes inventory, statistics, or other viable information, often takes weeks to aggregate and compile, especially if it includes a custom report of any sort.

The generation of custom reports is a problem that permeates every informational transaction. Whether a client is a company or even an individual, the enterprise that has the requested information often has the correct desired data, but the data may not be compiled in a way that provides the client with a clear and concise version of the information requested. This is problematic because the entire process of generating a custom report is riddled with challenges.

First, the client must ensure that the specific report request is understood. Then, if the requested report fails to match a previous report template, the company providing the information must find the right internal personnel to find the stored data and properly compile the data in a presentable format. Furthermore, there may be data access restrictions, or a requested dataset may span more than one field of expertise and therefore require additional internal coordination that may increase the amount of time and resources required to generate the report.

Finally, after receiving the finished generated report, the client can confirm whether the custom report is relevant and accurate; however, if the report lacks any necessary or desired information, the entire process must be repeated at least one more time, costing more time and money.

SUMMARY OF THE DISCLOSURE

What is needed is system for adaptive report generation that can provide customized reports in substantially real-time, even without a prior relevant query from which to base and compile the report.

The present disclosure provides for systems and methods for substantially real-time adaptive report generation. In some embodiments, an adaptive report system in accordance with the present disclosure may comprise at least one query. In some implementations, the adaptive report system may comprise at least one voice control component. In some aspects, the adaptive report system may comprise at least one report.

In some embodiments, the adaptive report system of the present disclosure may comprise one or more verifications. In some implementations, the adaptive report system may comprise at least one natural language processor. In some aspects, the adaptive report system may comprise at least one translated query. In some embodiments, the adaptive report system may comprise at least one database query.

In some implementations, the adaptive report system of the present disclosure may comprise at least one database. In some aspects, the query may comprise at least one audio signal, and the voice control component may convert the audio signal to text. In some embodiments, when the query has not been previously submitted, the adaptive report system may store one or more verification metrics or analytics associated with the query to improve the accuracy of future report generation.

BRIEF DESCRIPTION OF THE DRAWINGS

The accompanying drawings that are incorporated in and constitute a part of this specification illustrate several embodiments of the disclosure and, together with the description, serve to explain the principles of the disclosure.

DETAILED DESCRIPTION

The present disclosure provides generally for systems and methods for substantially real-time adaptive report generation. According to the present disclosure, adaptive report generation may be created in substantially real-time, as requested by a user, even when the request may comprise a novel aggregation of data stored within one or more databases that may be distributed across one or more different enterprises.

In the following sections, detailed descriptions of examples and methods of the disclosure will be given. The descriptions of both preferred and alternative examples, though thorough, are exemplary only, and it is understood to those skilled in the art that variations, modifications, and alterations may be apparent. It is therefore to be understood that the examples do not limit the broadness of the aspects of the underlying disclosure as defined by the claims.

Figure 1:
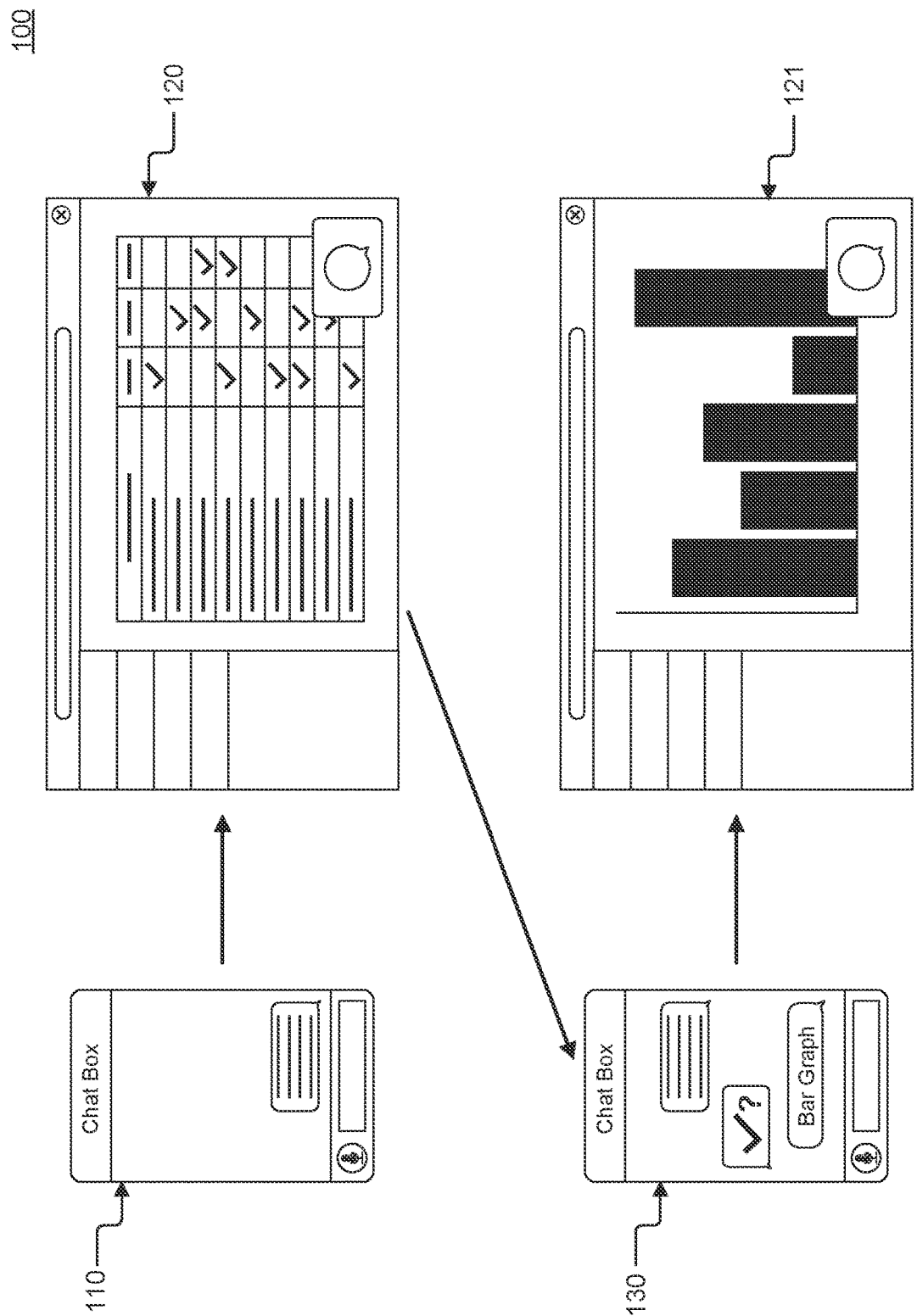
FIG. 1 illustrates an exemplary adaptive report system, according to some embodiments of the present disclosure.

Referring now to FIG. 1, an exemplary adaptive report system 100 is illustrated. In some embodiments, the adaptive report system 100 may comprise at least one query 110. In some implementations, the adaptive report system 100 may comprise one or more reports 120, 121. In some aspects, the adaptive report system 100 may comprise at least one verification 130.

In some embodiments, the query 110 may comprise a voice-dictated or text-based query 110 that may be submitted by at least one user and received by the adaptive report system 100 via at least one user interface. By way of example and not limitation, the user interface may comprise at least one of: an audio receiving device, such as a microphone; an input device, such as a touchscreen, keyboard, keypad, or mouse; or a display device, such as a display screen, as non-limiting examples. In some implementations, a voice-dictated query 110 may be received in the form of conversational, common, or natural language. In some aspects, a user may speak using generic common language words and phrases to ask a question or otherwise describe the contents of a desired report. The conversational language may enable the user to describe the desired report without needing to know or memorize one or more key terms or phrases.

In some embodiments, the adaptive report system 100 may receive and interpret the natural language query 110 and decipher one or more corporate language terms or phrases from the query 110. In some implementations, the adaptive report system 100 may interpret inventory terminology, marketing terminology, technical terminology, and/or internal labeling terminology, as a non-limiting list of exemplary categories of potentially receivable terms or phrases, as "in-house," industrial, or corporate language terms or phrases. In some aspects, the adaptive report system 100 may convert the received query 110 from conversational or natural language to a company's or industry's corporate language. The process of converting the natural language query 110 into corporate language by way of translation may enable the adaptive report system 100 to respond effectively to novel queries 110.

By way of comparison and not limitation, in some implementations, a traditional autonomous conversation between a user and a computer-based virtual assistant may be based on a predetermined number of potential responses related to an anticipated field of inquiry. The number of acceptable received queries from a user may therefore be limited to the anticipated field of inquiry and to a limited number of formats. This is a result of the inevitable impossibility of the autonomous conversational virtual assistant being able to process a nearly infinite number of potential requests in any form and accurately provide a correct relevant answer to the user.

In contrast, the adaptive report system 100, by translating the received natural language query 110 into a corporate language rather than matching the query to a plurality of predetermined terms or phrases, the adaptive report system 100 may accurately receive and process a query 110 that has never been previously submitted to the adaptive report system 100 and use the novel query 100 to generate a novel customized report 120 that has not previously existed that corresponds to the submitted query 110, despite having no previous context to compare either the query 110 or the report 120 and having no previously established association between the query 110 and the information or data in the report 120. In some aspects, the adaptive report system 100 may store previous queries 110 and reports 120 and the associations therebetween within one or more memory resources as an amount of training data that may be used to facilitate enhancement of the performance, functionality, efficiency, and/or accuracy of the adaptive report system 100 when generating future reports 120 from future queries 110.

In some embodiments, the adaptive report system 100 may comprise at least one natural language processor (NLP) that may facilitate the conversion or translation of a received natural language query 110 into at least one corporate language. In some implementations, the adaptive report system 100 may present at least one verification 130 of the report 120 to at least one user via at least one user interface to solicit feedback from the user.

In some aspects, the adaptive report system 100 may present a verification 130 to a user before the adaptive report system 100 presents a report 120. In some embodiments, the adaptive report system 100 may present a verification 130 to the user after the adaptive report system 100 presents the report 120. In some implementations, the adaptive report system 100 may be configured to receive at least one interaction from the user pertaining to the verification 130, such as, for example and not limitation, via at least one user interface, to obtain feedback from the user. By way of example and not limitation, feedback may comprise an affirmation of an accuracy or inaccuracy of the report 120.

In some aspects, when the verification 130 may be presented to the user after the report 120, the adaptive report system 100 may use the feedback received from the user to refine the compilation of the data as interpreted by the NLP based on the associated received query 110. In some embodiments, when the verification 130 is presented to the user after the report 120, the adaptive report system 100 may use the feedback received from the user to refine the process of handling future novel queries 110.

In some implementations, if a response to a verification 130 from a user affirms the accuracy of a report 120 generated by a novel query 110, the adaptive report system 100 may approve and prompt the storage of the report 120 and the query 110 and the association therebetween in one or more memory resources as an amount of training data that enhances the performance, functionality, efficiency, and/or accuracy of the NLP when interpreting future novel subsequent queries 110 to generate future novel subsequent reports 120. In some non-limiting exemplary embodiments, affirmation of the accuracy of the report 120 may at least partially comprise a user selecting a symbol of approval, such as a check mark, plus sign, or similar icon, presented on the user interface using at least one input device. In some aspects, if the verification 130 affirms the accuracy of the report 120 generated by a novel query 110, the affirmation may prompt the adaptive report system 100 to store one or more analytics associated with the query 110, such as, for example and not limitation, the process of deduction from receiving a novel query 110 to generating a novel report 120, to improve the accuracy of predictive generation of future novel reports 120 from novel queries 110 facilitated by the adaptive report system 100.

In some embodiments, a response from a user to a verification 130 may comprise a second query 110 for a second new, supplemental, or alternative report 121. In some implementations, a user may interact with the verification 130 of a query 110 to negatively affirm an inaccuracy of a generated report 120. In some non-limiting exemplary embodiments, affirmation of the inaccuracy of the report 120 may at least partially comprise the user selecting a symbol of disapproval, such as an "x," minus sign, or similar icon, presented on the user interface using at least one input device. In some aspects, the verification 130 of such inaccuracy may initiate the generation of a second report 121. In some embodiments, the user response to the verification 130 may initiate the production a second report 121 that expounds on or displays alternative information to the first report 120.

In some implementations, the verification 130 may enable a user to conduct a process of discovery whereby, upon review of the first report 120, the user may determine that additional insight or information is needed or desired. In some aspects, the process of presenting the user with a verification 130 and generating a report 120, 121 may continue reiteratively until the user is satisfied that a sufficient number and/or quality of reports 120, 121 have been generated that portray all desired compilations of information.

In some aspects, the query 110 may comprise a question or request from one or more users for information that requires data to be aggravated and compiled into one or more reports 120, 121 generated by the adaptive report system 100 and presented to the user(s) via at least one user interface. In some implementations, at least one of the reports 120, 121 generated by the adaptive report system 100 may comprise at least one visualization of the compiled data, wherein the visualization may comprise any one of a plurality of potential formats, such as a pie chart, bar graph, line graph, or distribution curve, as non-limiting examples. In some non-limiting exemplary embodiments, the format of the visualization may be modified or altered by at least one user, such as, by way of example and not limitation, via the at least one user interface.

In some embodiments, the query 110 may comprise a command or request for the adaptive report system 100 to perform at least one action, implement at least one configuration, or adjust at least one setting. By way of example and not limitation, a user may submit a query 110 that instructs the adaptive report system 100 to modify one or more configurations or settings either internally within the adaptive report system 100 or for one or more external systems that may be communicatively coupled to the adaptive report generation system 100, to create one or more groups of data or information within the adaptive report system 100 or one or more external systems, to create one or more visual representations of at least one fluctuating quantifiable metric, to schedule the generation or presentation of a report 120 at a particular time, or generate and present at least one report 120 in the form of a notification when one or more threshold events may be detected. In some aspects, upon completion of the performance of the requested action(s), the adaptive report system 100 may present the user with a verification 130 to solicit feedback from the user regarding the accuracy of the completed task. In some implementations, the adaptive report system 100 may use the provided feedback to at least partially direct the performance of future actions.

For example, the adaptive report system 100 may be used with one or more utility companies, and the adaptive report system 100 may receive a query 110 from a user that instructs the adaptive report system 100 to accept the continuous consumption validation failures for a particular day. To continue this example, the adaptive report system 100 may also receive a query 110 from the user to, for example and not limitation, create a database group of agricultural meters that all comprise a peak flow of over 20 CCf/hour. To still further illustrate this example, the adaptive report system 100 may receive a query 110 from the user to create one or more virtual meters configured to display a sum or average of a plurality of utility meters associated with a plurality of customers or a query 110 comprising a request to generate and present one or more notifications when one or more utility customers have exceeded a minimum threshold of utility usage.

In some implementations, the adaptive report system 100 may be configured to receive at least one query 110 from a user that comprises a request for assistance, guidance, or instructions for performing at least part of a task. For example, the adaptive report system 100 may be associated with one or more utility companies, and a user may submit a query 110 that asks the adaptive report system 100 how to set up a virtual meter for a group of meters or how to reduce the user's validation failures. The adaptive report system 100 may respond to the received query 110 with a report 120 that comprises an answer to the user's question.

In some aspects, the adaptive report system 100 may determine that the adaptive report system 100 is unable to provide an accurate report 120 in the form of an answer to a particular question or request for assistance without soliciting any response to a verification 130 from the user. In such aspects, the adaptive report system 100 may be configured to provide the user with an alternative report 121 in the form of an explanation, request for more information, or delayed response.

For instance, by way of example and not limitation, the adaptive report system 100 may provide an auditory or written or otherwise visual report 121 that the adaptive report system 100 needs to refer the user to another individual for an answer or assistance or that a report 121 will be emailed or otherwise delivered to the user at a later time once the adaptive report system 100 has had time to process the relevant query 110 and determine, aggregate, compile, obtain, or otherwise produce the report 121.

In some embodiments, the adaptive report system 100 may be configured to receive at least one query 110 in the form of a request for troubleshooting assistance or error diagnosis within the adaptive report system 100. By way of example and not limitation, a user may submit a query 110 to the adaptive report system 100 that questions why one or more fields in a visual dashboard or table do not contain any data or why one or more virtual meters are not calculating or displaying any data.

In some implementations, the adaptive report system 100 may be configured to receive at least one query 110 in the form of a request for error message generation. In some non-limiting exemplary embodiments, there may be circumstances in which the adaptive report system 100 may be unable to produce a sufficient or satisfactory report 120 in response to a first query 110 from a user. In such circumstances, the adaptive report system 100 may be configured to receive a second query 110 from the user asking for the generation of a secondary or supplemental report 121 in the form of an error message or similar error or diagnostic summary that the user can present to a help or service professional for further assistance.

In some embodiments, the adaptive report system 100 may be configured to provide at least one report 120 in the form of at least one assessment of at least one database that may be integrated with or communicatively coupled to the adaptive report system 100. By way of example and not limitation, the adaptive report system 100 may receive a query 110 from a user that requires access to data that is not currently available or accessible to the adaptive report system 100. Instead of providing a general response to the user that a successful report 120 could not be generated in response to the query 110, the adaptive report system 100 may provide an alternative report 121 that specifically indicates or identifies what data needs to be obtained or accessed in order to successfully respond to the original query 110.

For example, if a user submits a query 110 to the adaptive report system 100 regarding potential water usage at a particular location or region, the adaptive report system 100 may require access to data pertaining to the irrigable square footage of that location or region. If this data is not accessible or available, the adaptive report system 100 may provide an auditory, written, or otherwise perceivable report 121 that indicates that the query 110 could not be sufficiently addressed because there is no data on irrigable square footage within or available to the adaptive report system 100. In some aspects, the adaptive report system 100 may further indicate to the user how to remedy a situation involving insufficient availability of or access to data. To further illustrate the previous example, the adaptive report system 100 may indicate to the user that remedying the situation may require a data synchronization to the appropriate system of record.

Alternatively, in some implementations, the adaptive report system 100 may indicate to a user that the data relevant to the query 110 exists generally but is not available for a specific query 110. To continue from the previous example, in some non-limiting exemplary embodiments, the adaptive report system 100 may provide a report 121 to the user that the relevant irrigation data is coming into the adaptive report system 100 but does not exist for the specific location identified in the query 110. In some aspects, if necessary, the report 121 may further comprise one or more potential remedial actions to be taken by the user. To still further illustrate the previous example, the report 121 may suggest that the user check to make sure the relevant data exists for the location specified in the query 110 in the relevant customer information system.

In some implementations, the adaptive report system 100 may be configured for use with at least one of: a mobile computing device, such as a smartphone; a wearable technology device, such as a smartwatch or smart glasses; an augmented reality device, such as a headset or goggles; or any other type of head-up display, such as may be associated with automobiles or aircraft. In some aspects, one or more software applications may be implemented or associated with one or more of these devices to, among other things, optimize the display of the adaptive report system 100 upon the device(s), utilize location information that may be retrieved from the devices, or present one or more reports 120, 121 as notifications that may be displayed on the device(s).

For example, a user wearing a smartwatch may opt to allow the adaptive report system 100 to access and use the location information within or associated with the smartwatch, such as, for example and not limitation, location information that may be accessed from one or more Global Positioning System (GPS) receivers within the smartwatch. The user may then be able to submit a query 110 to the adaptive report system 100 that is at least partially based on the user's location. To further illustrate this example, the user may submit a query 110 requesting information about the three highest revenue generating customers within a mile of the user's current location. If the user opts to let the adaptive report system 100 send notifications to the smartwatch (or any other previously-identified device), then the user could include a request for one or more types of notifications with the submitted query 110. As a further illustrative example, a user who may be a service technician for an electrical company may submit a query 110 that requests that the adaptive report system 100 present a report 120 in the form of a notification when the user travels past an overloaded transformer along the technician's work route.

In some aspects, the adaptive report system 100 may comprise one or more authentication means from any user(s) attempting to retrieve data from one or more databases using the adaptive report system 100. In some embodiments, by way of example and not limitation, the authentication may comprise a password, passcode, vocal sample, fingerprint scan, retinal scan, facial recognition, or any similar means of identifying one or more users.

In some implementations, the adaptive report system 100 may be configured to interact with one or more third-party software applications in order to access one or more databases or other data sources that may be associated with such third-party software applications.

In some embodiments, the adaptive report system 100 may comprise one or more processors communicatively coupled to one or more internal or external memory resources, such as, for example and not limitation, one or more databases, via one or more wireless or wired connections, wherein the one or more memory resources may comprise one more instructions, or code, in the form of, for example and not limitation, one or more software applications, that may facilitate the performance of the processes and methods accomplished or carried out by the adaptive report system 100. In some aspects, the one or more processors of the adaptive report system 100 may be communicatively coupled, either wirelessly or via one or more wired connections, to at least one of: the at least one user interface and the at least one NLP.

Figure 2:
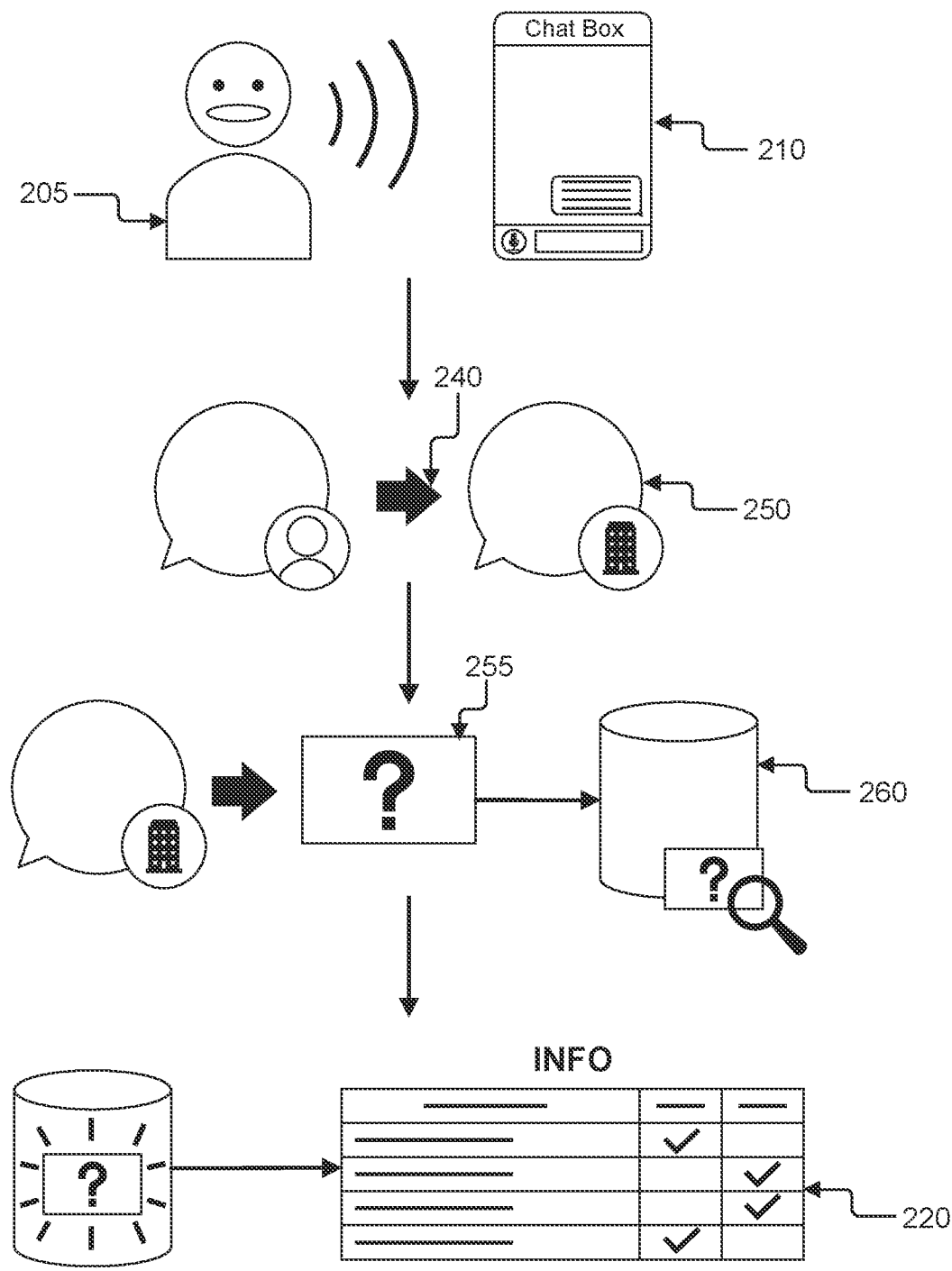
FIG. 2 illustrates an exemplary adaptive report system, according to some embodiments of the present disclosure.

Referring now to FIG. 2, an exemplary adaptive report system 200 is illustrated. In some embodiments, the adaptive report system 200 may comprise at least one user 205. In some implementations, the user 205 may submit at least one query 210 through vocal dictation or submitted text, as a list of non-limiting examples. In some aspects, the query 210 may be received and processed by at least one natural language processor (NLP) 240 via at least one user interface.

In some embodiments, the NLP 240 may convert the query 210 into a translated query 250. In some implementations, a voice-dictated query 210 may be received in common, conversational, or natural language. In some aspects, the user 205 may speak using common generic language to ask a question or otherwise describe the contents of a desired report 220. The use of conversational or natural language may enable the user 205 to describe the desired report 220 without needing to know or memorize one or more key terms or phrases.

In some embodiments, the NLP 240 may interpret the received natural language query 210 and decipher one or more corporate language terms or phrases from the query. In some implementations, the NLP 240 may interpret inventory terminology, marketing terminology, technical terminology, and internal labeling terminology, as a non-limiting list of exemplary categories of potentially receivable terms or phrases, as "in-house" or corporate language terms or phrases. In some aspects, the NLP 240 may convert the received query 210 from conversational or natural language to a company's or industry's corporate language. In some embodiments, the process of converting the natural language query 210 into corporate language may generate a translated query 250. The process of converting the natural language query 210 into corporate language by way of translation may enable the adaptive report system 200 to effectively respond to novel queries 210.

By way of comparison and not limitation, in some implementations, a traditional autonomous conversation between a user and a computer-based virtual assistant may be based on a predetermined number of potential responses related to an anticipated field of inquiry. The number of acceptable received queries 210 may therefore be limited to the anticipated field of inquiry and to a limited number of formats. This may be a result of the inevitable impossibility of the autonomous conversational virtual assistant being able to process a nearly infinite number of potential requests in any form and accurately provide a correct relevant answer to the user 205.

In contrast, the NLP 240, by translating the natural language query 210 into a corporate language rather than matching the query 210 to a plurality of predetermined terms or phrases, the NLP 240 may accurately generate and process a translated query 250 that has never been previously submitted to the adaptive report system 200 and use the translated query 250 to generate a novel customized report 220 that has not previously existed that corresponds to the submitted translated query 250, despite having no previous context to compare either the query 210 or the report 220 and having no previously established association between the query 210 and the information or data in the report 220.

In some aspects, the adaptive report system 200 may store an amount of training data within one or more memory resources communicatively coupled to the adaptive report system 200, wherein the amount of training data at least partially comprises one or more previous queries 210, translated queries 250, and/or reports 220, as well as one or more associations between the report(s) 220 and at least one of: one or more queries 210 and one or more translated queries 250, wherein the amount of training data enhances the performance, functionality, efficiency, and/or accuracy of the NLP 240 when interpreting one or more future subsequent novel queries 210 and converting the subsequent queries 210 into one or more subsequent translated queries 250 to generate one or more future novel subsequent reports 220.

In some implementations, the translated query 250 may initiate the generation of at least one database query 255, wherein the translated query 250 may instruct the at least one database query 255. In some aspects, the database query 255 may at least partially determine one or more parameters of a search that may be directed to at least one database 260 that may be configured internally within the adaptive report system 100 or configured externally and associated with the adaptive report system 200, wherein the at least one database 260 may comprise data that may be relevant to the database query 255.

In some embodiments, the database query 255 may further at least partially comprise one or more instructions for at least one of: data management within at least one database 260 and data retrieval from at least one database 260. For example, the database query 255 may request all rows of a table in a database 260 labeled "pipes" that comprise a specified length of 2 feet or longer. In some implementations, the database query 255 may at least partially comprise a Structured Query Language, or "SQL" query.

In some embodiments, one or more databases 260 associated with the adaptive report system 200 may be communicatively coupled to at least one component of the adaptive report 200, such as, by way of example and not limitation, NLP 240. In some implementations, one or more databases 260 may be communicatively coupled to the adaptive report system 200 via a wireless connection or a wired connection.

In some aspects, one or more databases 260 associated with the adaptive report system 200 may be connected to the adaptive report system 200 via at least one network connection, such as the global public Internet or a private local area network connection.

In some embodiments, one or more results from the database query 255 may be presented as at least one report 220, wherein the one or more results may be at least partially based on data retrieved via the database query 255. In some implementations, the database query 255 may be presented via at least one user interface that may be configured to make the database query 255 editable by the user 205. Continuing the previous example, the user 205 may edit a database query 255 by modifying one or more parameters of the database query 255 to specify a limit of the first five results in the database 260 table "pipes" that comprise a specified length of 2 feet or longer.

In some aspects, the user 205 may modify a report 220 by modifying the associated database query 255 by selecting an option within the user interface of the adaptive report system 200 that enables the text of the database query 255 to be edited or modified. In some embodiments, the adaptive report system 200 may comprise one or more reference tools to facilitate the implementation of one or more common edits to the database query 255. In some implementations, the one or more reference tools may enable common users 205 to modify a database query 255 without any advanced knowledge of coding syntax for database queries 255. In some aspects, the edits the user 205 applies to the database query 255 may be analyzed or stored by the adaptive report system 200 to improve the generation of future translated queries 250 that may be produced by the NLP 240 and/or to improve the generation of database queries 255 that may be compiled by the adaptive report system 200.

Figure 3:
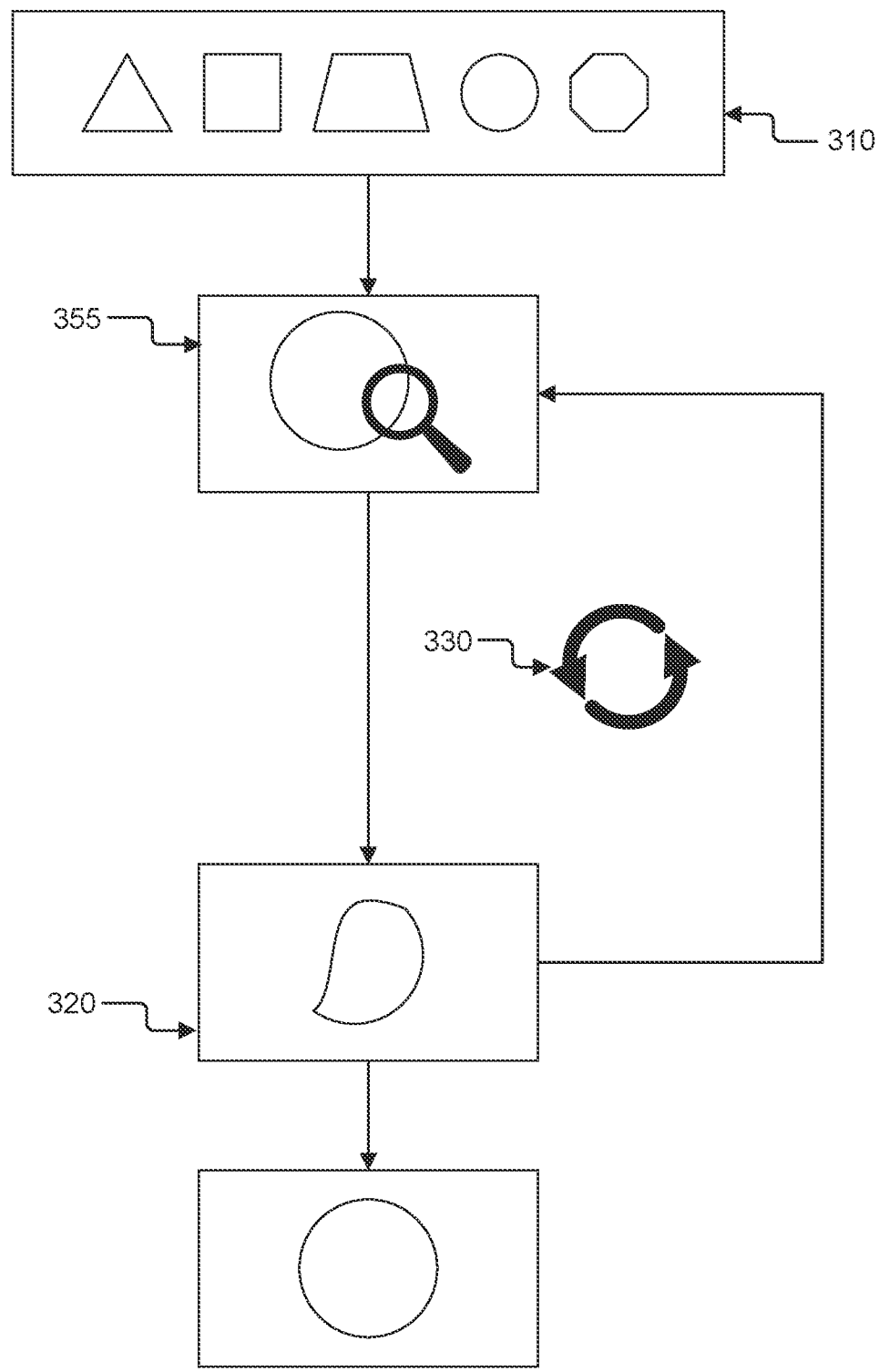
FIG. 3 illustrates an algorithm of an exemplary adaptive report system, according to some embodiments of the present disclosure.

Referring now to FIG. 3, an algorithm of an exemplary adaptive report system 300 is illustrated. In some embodiments, the adaptive report system 300 may comprise at least one query 310. In some implementations, the at least one query 310 may be converted by the adaptive report system 300 to at least one database query 355. In some aspects, one or more results from the database query 355 may be compiled and used to produce at least one report 320 that may be presented to at least one user. In some embodiments, the adaptive report system 300 may use at least one verification 330 to solicit feedback from the user to iteratively improve the accuracy of report 320 generation from submitted queries 310.

In some embodiments, the adaptive report system 300 may present at least one verification 330 of the report 320 to at least one user after the adaptive report system 300 presents a report 320 to the user. In some implementations, the user may interact with the verification 330, such as, for example and not limitation, via at least one user interface, to provide feedback to the adaptive report system 300.

In some aspects, when the verification 330 may be presented to the user after the report 320, the adaptive report system 300 may use the feedback received from the user to refine the compilation of the data as interpreted by the NLP based on the associated received query 310. In some embodiments, when the verification 330 may be presented to the user after the report 320, the adaptive report system 300 may use the feedback received from the user to refine the process of handling future novel queries 310.

In some implementations, if the response to a verification 330 from a user affirms the accuracy of a report 320 generated by a novel query 310, the adaptive report system 300 may approve and prompt the storage of an amount of training data within one or more memory resources communicatively coupled to the adaptive report system 300, wherein the amount of training data at least partially comprises the report 320 and at least one of: the query 310 and the database query 355 that was generated from the query 310, as well as one or more associations between the report 320 and the query 310 and/or the database query 355, wherein the amount of training data facilities enhancement of the performance, functionality, efficiency, and/or accuracy of the NLP when interpreting one or more future novel subsequent queries 310 and converting the subsequent queries 310 to one or more subsequent database queries 355 to generate one or more novel subsequent reports 320. In some aspects, if the verification 330 affirms the accuracy of the report generated by a novel query 310, the affirmation may prompt the adaptive report system 300 to store one or more analytics associated with the query 310, such as, by way of example and not limitation, the process of deduction from receiving a novel query 310 to generating a novel report 320, to improve the accuracy of predictive generation of future novel reports 320 from novel queries 310 facilitated by the adaptive report system 300.

In some embodiments, a response from a user to a verification 330 may comprise a second query 310 for a second new, supplemental, or alternative report 320. In some implementations, a user may interact with the verification 330 of a query 310 to negatively affirm an inaccuracy of a generated report 320. In some aspects, the verification 330 of such inaccuracy may initiate the generation of a second report 320. In some embodiments, the user response to the verification 330 may initiate the production of a second report 320 that expounds on or displays alternative information to the first report 320.

In some implementations, the verification 330 may enable a user to conduct a process of discovery wherein, upon review of the first report 320, the user may determine that additional insight or information is needed or desired. In some aspects, the process of presenting the user with a verification 330 and generating a report 320 may continue reiteratively until the user is satisfied that a sufficient number and/or quality of reports 320 have been generated that portray all desired compilations of information.

Figure 4:
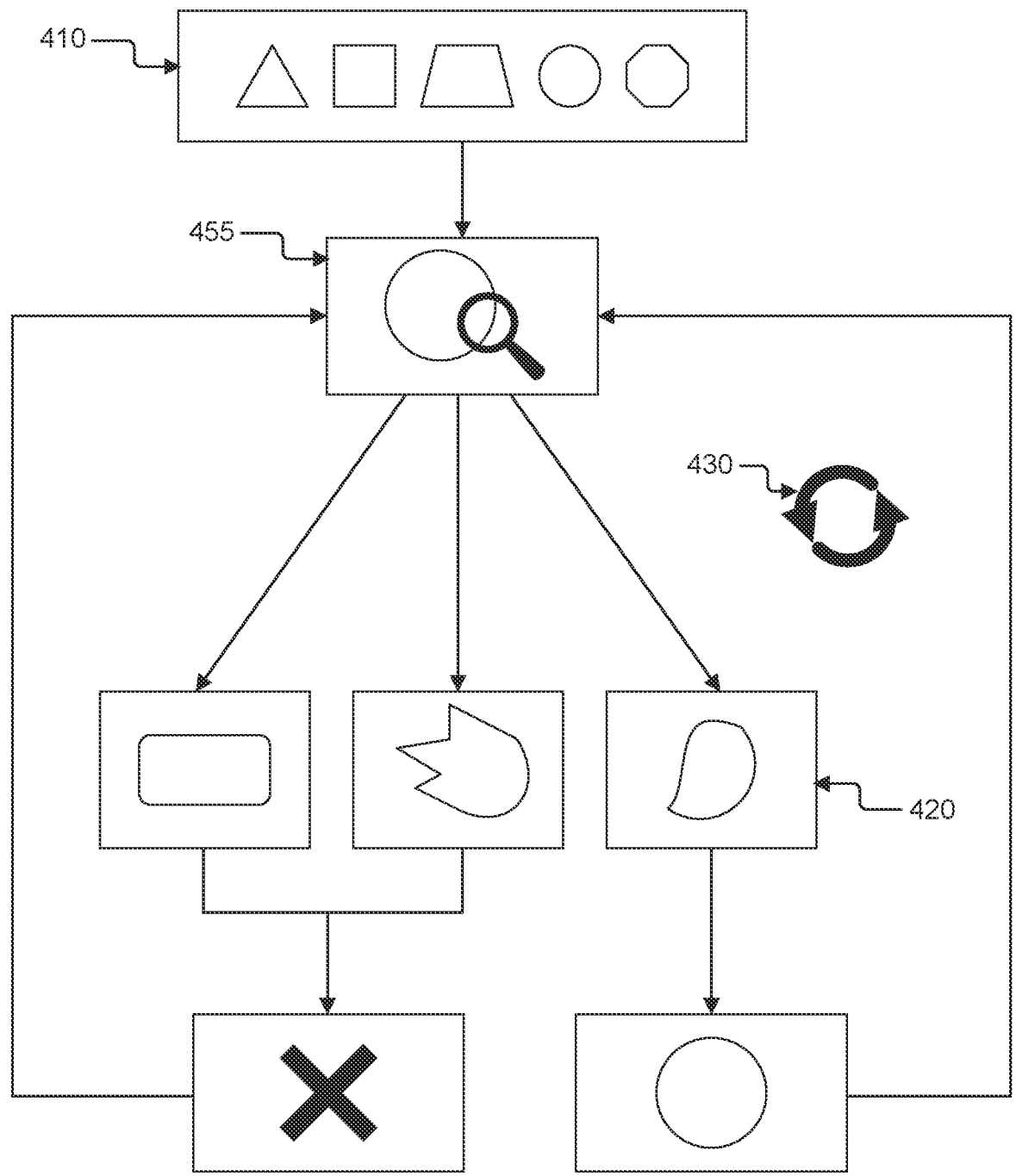
FIG. 4 illustrates an algorithm of an exemplary adaptive report system, according to some embodiments of the present disclosure.

Referring now to FIG. 4, an algorithm of an exemplary adaptive report system 400 is illustrated. In some embodiments, the adaptive report system 400 may comprise at least one query 410. In some implementations, the at least one query 410 may be converted by the adaptive report system 400 to at least one database query 455. In some aspects, one or more results from the database query 455 may produce at least one report 420 that may be presented to at least one user. In some implementations, the adaptive report system 400 may use at least one verification 430 to solicit feedback from the user to iteratively improve the accuracy of report 420 generation from submitted queries 410.

In some embodiments, the adaptive report system 400 may present at least one verification 430 of the report 420 to at least one user after the adaptive report system 400 presents a report 420 to the user. In some implementations, the user may interact with the verification 430, such as, for example and not limitation, via at least one user interface, to provide feedback to the adaptive report system 400.

In some aspects, when the verification 430 may be presented to the user after the report 420, the adaptive report system 400 may use the feedback received from the user to refine the compilation of the data as interpreted by the NLP based on the associated query 410. In some embodiments, when the verification 430 may be presented to the user after the report 420, the adaptive report system 400 may use the feedback received from the user to refine the process of handling future novel queries 410.

In some implementations, if the response to a verification 430 from a user affirms the accuracy of a report 420 generated by a novel query 410, the adaptive report system 400 may approve and prompt the storage of an amount of training data within one or more memory resources communicatively coupled to the adaptive report system 400, wherein the amount of training data at least partially comprises the report 420 and at least one of: the query 410 and the database query 455 that was generated from the query 410, as well as one or more associations between the report 420 and the query 410 and/or the database query 455, wherein the amount of training data facilitates enhancement of the performance, functionality, efficiency, and/or accuracy of the NLP when interpreting one or more future novel subsequent queries 410 and converting the subsequent queries 410 to one or more subsequent database queries 455 to generate one or more future novel subsequent reports 420. In some aspects, if the verification 430 affirms the accuracy of the report generated by a novel query 410, the affirmation may prompt the adaptive report system 400 to store one or more analytics associated with the query 410, such as, by way of example, the process of deduction from receiving a novel query 410 to generating a novel report 420, to improve the accuracy of predictive generation of future novel reports 420 from novel queries 410 facilitated by the adaptive report system 400.

In some embodiments, a response from a user to a verification 430 may comprise a second query 410 for a second new, supplemental, or alternative report 420. In some implementations, a user may interact with the verification 430 of a query 410 to negatively affirm an inaccuracy of a generated report 420. In some aspects, the verification 430 of such inaccuracy may initiate the generation of a second report 420. In some embodiments, the user response to the verification 430 may initiate the production a second report 420 that expounds on or displays alternative information to the first report 420.

In some implementations, the verification 430 may enable a user to conduct a process of discovery wherein, upon review of the first report 420, the user may determine that additional insight or information is needed or desired. In some aspects, the process of presenting the user with a verification 430 and generating a report 420 may continue reiteratively until the user is satisfied that a sufficient number and/or quality of reports 420 have been generated that portray all desired compilations of information.

Figure 5:
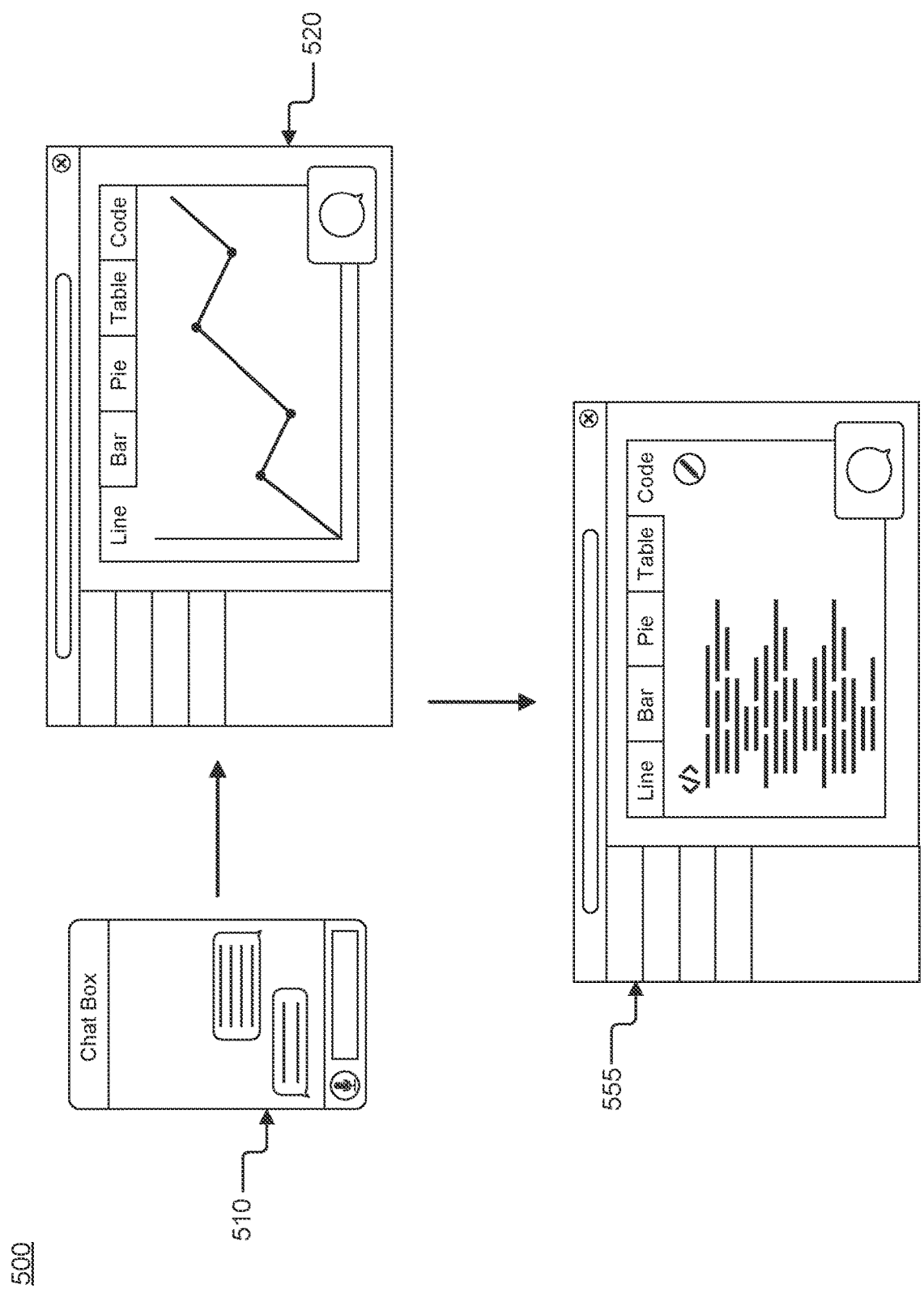
FIG. 5 illustrates an exemplary adaptive report system, according to some embodiments of the present disclosure.

Referring now to FIG. 5, an exemplary adaptive report system 500 is illustrated. In some embodiments, the adaptive report system 500 may comprise at least one query 510. In some implementations, the adaptive report system 500 may produce at least one report 520 from the at least one query 510. In some aspects, when a user may want to modify a created report 520, the user may edit the database query 555 via at least one user interface.

In some implementations, the adaptive report system 500 may receive a query 510 from a user and convert the query 510 to a translated query 550 that may initiate the generation of at least one database query 555, wherein the translated query 550 may instruct the at least one database query 555. In some aspects, the database query 555 may at least partially determine one or more parameters of a search that may be directed to at least one database that may be configured internally within the adaptive report system 500 or configured externally and associated with the adaptive report system 500, wherein the at least one database may comprise data that may be relevant to the database query 555. For example, the database query 555 may request all rows of a table in a database labeled "pipes" that comprise a specified length of 2 feet or longer. In some aspects, the database query 555 may at least partially comprise an SQL query.

In some embodiments, one or more databases associated with the adaptive report system 500 may be communicatively coupled to at least one component of the adaptive report 500, such as, by way of example and not limitation, at least one NLP. In some implementations, one or more databases may be communicatively coupled to the adaptive report system 500 via a wireless connection or a wired connection. In some aspects, one or more databases associated with the adaptive report system 500 may be connected to the adaptive report system 500 via at least one network connection, such as the global public Internet or a private local area network connection.

In some embodiments, one or more results from the database query 555 may be presented as at least one report 520, wherein the one or more results may be at least partially based on data retrieved via the database query 555. In some implementations, the database query 555 may be presented via at least one user interface that may be configured to make the database query 555editable by a user. Continuing the previous example, the user may edit a database query 555 by modifying one or more parameters of the database query 555 to specify a limit of the first five results in the database table "pipes" that comprise a specified length of 2 feet or longer.

In some aspects, a user may modify a report 520 by modifying the database query 555 associated there with by selecting an option within the user interface of the adaptive report system 500 that enables the text of the database query 555 to be edited or modified. In some embodiments, the adaptive report system 500 may comprise one or more reference tools to facilitate the implementation of one or more common edits to the database query 555. In some implementations, the one or more reference tools may enable common users to modify a database query 555 without any advanced knowledge of coding syntax for database queries 555.

In some aspects, the ability to edit database queries 555 may allow a user to correct simple syntax errors or table name discrepancies in a database query 555. As an example, the adaptive report system 500 may misinterpret a request and compile an inaccurate database query 555 based on an incorrectly translated natural language query 510 term. This error may be fixed more easily or efficiently by editing the intended query 510 term in the existing database query 555 via an input device associated with a user interface rather than making a second attempt to create a new query 510. In some implementations, the edits the user applies to the database query 555 may be analyzed or stored by the adaptive report system 500 to improve the generation of future translated queries 550 that may be produced by the NLP and/or to improve the generation of database queries 555 that may be compiled by the adaptive report system 500.

As another example, if a user were to submit an SQL query that used double-quotes instead of single-quotes (e.g. WHERE="" would generate an error), the adaptive report system 500 may respond with an error message, as well as a suggested query 510 that may work with the intended schema. This may offer users a way to boost efficiency and productivity by not having to spend time writing out any SQL blocks from scratch.

Figure 6:
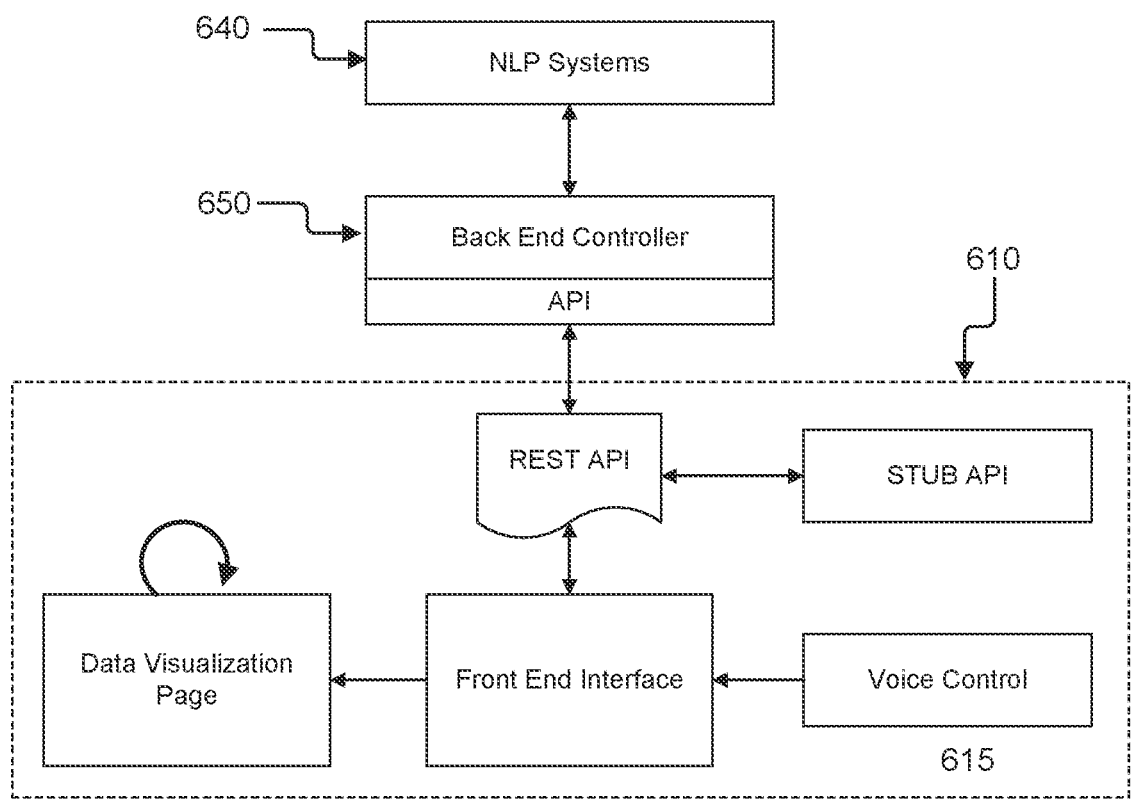
FIG. 6 illustrates an exemplary adaptive report system, according to some embodiments of the present disclosure.

Referring now to FIG. 6, an exemplary adaptive report system 600 is illustrated. In some embodiments, the adaptive report system 600 may comprise at least one NLP 640. In some implementations, the NLP 640 may interface with at least one translated query 650. In some aspects, the translated query 650 may be generated from at least one natural language query 610.

In some embodiments, the query 610 may comprise at least one application programming interface (API). In some implementations, the query 610 may comprise at least one voice control component 615, wherein the voice control component 615 may be configured to affect, influence, or modify at least one audio signal comprising one or more instructions for the query 610 received from at least one user via at least one audio receiving device associated with at least one user interface of the adaptive report system 600. In some aspects, the voice control component 615 may be configured to convert or translate the audio signal to at least one textual query.

In some embodiments, the voice control component 615 may comprise one or more hardware or software products, or both, for filtering undesired audio frequencies from the received audio signal(s). In some implementations, the voice control component 615 may be configured to compensate for a plurality of accents and methods of pronunciation. In some aspects, a verification response from a user may provide the voice control component 615 with feedback that may continually improve the accuracy of transcriptions of audio signals when the response to the verification affirms the accuracy or inaccuracy of a previous audio signal to textual transcription.

In some embodiments, the query 610 may comprise at least one data visualization page, wherein at least one report may be generated and visually presented in at least one format to a user after the query 610 has been processed by the adaptive report system 600. In some implementations, the user may have the ability to change or modify the visualization format of the report.

For example, a drop-down menu may be located beneath a currently presented report in the form of a bar graph. When an alternative visualization of the report is selected, such as, for example and not limitation, a pie chart, the report may update to reflect the desired visualization. In some aspects, when selecting a visualization, a user may submit a second query 610 to the adaptive report system 600. In some implementations, the query 610 may comprise a front-end user interface that presents the transcription of previously submitted audio queries 610 for review by a user.

In some aspects, the query 610 may comprise a Representational State Transfer, or "REST," API, wherein the REST API may comprise a data transfer architectural style for an API that may use HTTP requests to access and use data. In some embodiments, the REST API may facilitate data transfer between the query 610 and at least one database. In some implementations, the REST API may facilitate data interactions with the database such as reading data, updating data, creating data, and deleting operations concerning stored data, as a non-limiting list of examples.

In some aspects, the query 610 may comprise a stub API, wherein the stub API may allow the adaptive report system 600 to define a set of operations that may otherwise be performed against a real API endpoint. When components may be created that need to fetch data from a database, any of the API operations defined within a stub API may be selectable as options.

In some embodiments, the translated query 650 may interface with the NLP 640. In some implementations, the NLP 640 may convert a received natural language query 610 into a translated query 650. In some aspects, the translated query 650 may at least partially comprise a backend controller, wherein the backend controller may interface with one or more databases to facilitate data extraction and aggregation in accordance with the criteria outlined in the translated query 650.

Figure 7:
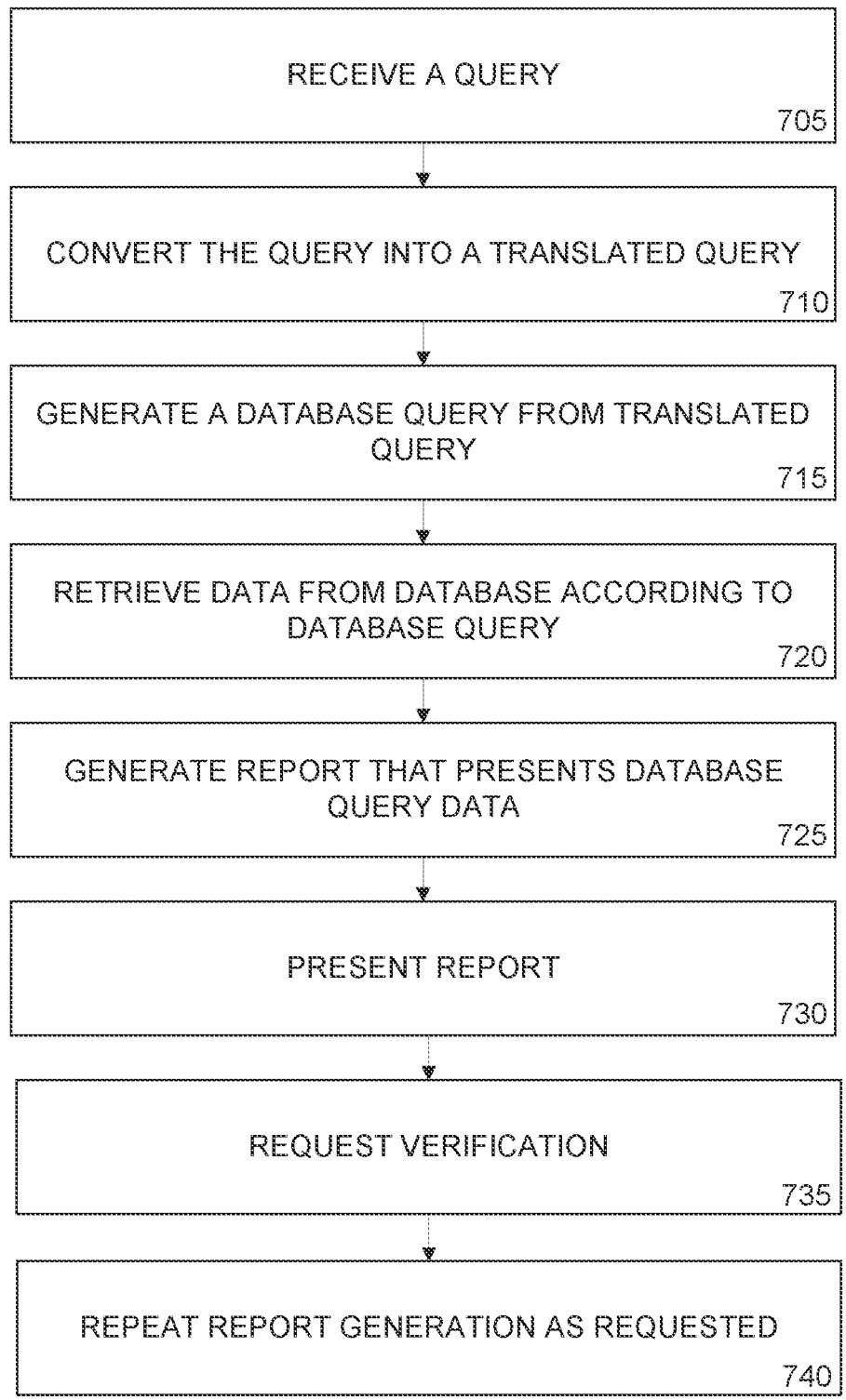
FIG. 7 illustrates method steps of an exemplary process for substantially real-time data retrieval using an adaptive report system, according to some embodiments of the present disclosure.

Referring now to FIG. 7, method steps of an exemplary process 700 for substantially real-time data retrieval using an adaptive report system are illustrated. At 705, at least one query may be received from at least one user via at least one user interface, wherein the at least one query is at least partially received via at least one of: an audio signal and a textual input from the at least one user. In some aspects, at 710, the at least one query may be converted into at least one translated query, wherein the conversion may be facilitated by at least one NLP, wherein the at least one NLP converts the at least one query into the at least one translated query by identifying one or more natural language terms within the at least one query and translating the the one or more natural language terms into an industrial or corporate language that forms the at least one translated query.

In some implementations, at 715, at least one database query may be generated from the at least one translated query. In some aspects, the database query may at least partially comprise an SQL query. In some embodiments, at 720, the at least one database query may be used to retrieve data from one or more databases according to one or more parameters defined by the at least one database query. At 725, at least one report that visually presents the data retrieved from the at least one database query may be generated. At 730, the at least one report may be presented to the at least one user, such as, for example and not limitation, via at least one user interface, and at 735, a response to at least one verification may be requested from the at least one user to verify or affirm the accuracy or inaccuracy of the generated report. In some implementations, at 740, the process of report generation may be repeated as requested by the user via the verification response received at 735.

Figure 8:
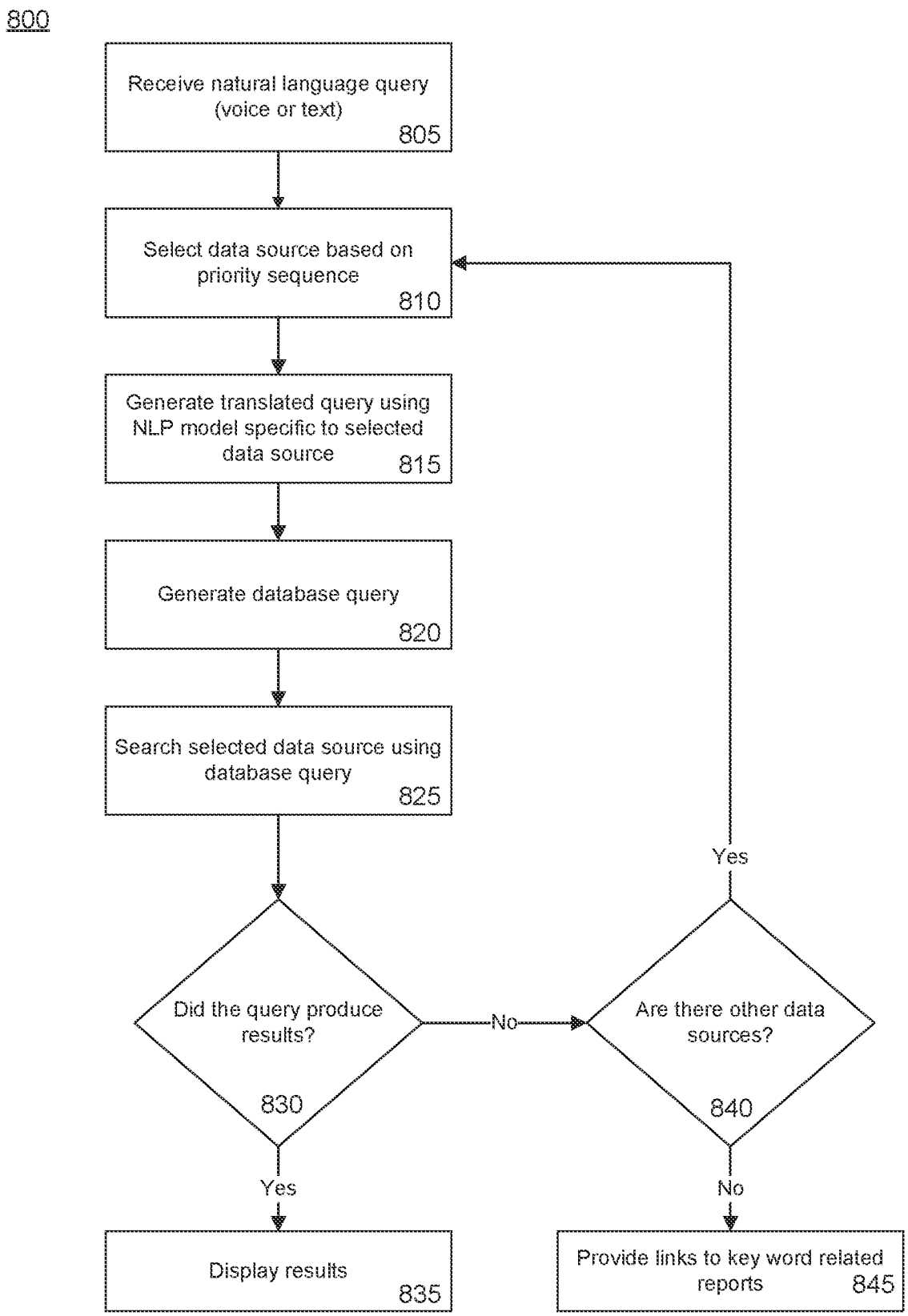
FIG. 8 illustrates method steps of an exemplary process for substantially real-time data retrieval using an adaptive report system that queries and retrieves data from multiple data sources sequentially, according to some embodiments of the present disclosure.

Referring now to FIG. 8, method steps of an exemplary process 800 for substantially real-time data retrieval using an adaptive report system that queries and retrieves data from multiple data sources sequentially are illustrated. At 805, at least one common or natural language query may be received in the form of at least one of: a voice or audio input or a textual input. In some aspects the received natural language query may involve referring to or searching one or more data sources, such as, by way of example and not limitation, one or more databases that may be communicatively coupled, either wirelessly or via one or more wired connections, to the adaptive report system. In some embodiments, at 810, a data source may be selected based on a previously determined priority sequence for all data sources, wherein the priority sequence may be determined at least partially by one or more users or completely autonomously by the adaptive report system.

In some aspects, the priority sequence may be at least partially based on how relevant the data within each data source is to the received query. In some implementations, at 815, the received natural language query may be converted into a translated query that at least partially comprises an industrial or corporate language using an NLP model that may be configured for use with the specific selected data source. In some aspects, at 820 one or more corrections or modifications may be performed on or applied to the translated query as needed to clean it up, enhance its clarity or accuracy, or at least partially convert it to an SQL format, and thereby generate at least one database query. In some embodiments, the corrections or modifications applied to generate the database query may be at least partially implemented by one or more users via at least one user interface, or the corrections or modifications may be identified and implemented in a completely autonomous manner by the adaptive report system. In some implementations, at 825, the selected data source may be searched using the database query.

In some aspects, at 830, it may be determined whether the query successfully retrieved relevant data to produce one or more results. In some embodiments, an affirmative determination may cause the process 800 to proceed to 835, while a negative determination may cause the process 800 to proceed to 840. In some implementations, at 835, the one or more results may be displayed or otherwise presented to at least one user via at least one user interface in the form of at least one report. In some aspects, at 840, it may be determined whether any other data sources are left to search. In some implementations, this determination may be made by the adaptive report system.

In some embodiments, an affirmative determination may cause the process 800 to proceed to 810, while a negative determination may cause the process 800 to proceed to 845. In some implementations, at 845, one or more links or citations may be provided to at least one user via at least one user interface that may direct the user(s) to one or more previously generated reports that nay be associated with one or more key words within the query that was used to search the data source(s).

Figure 9:
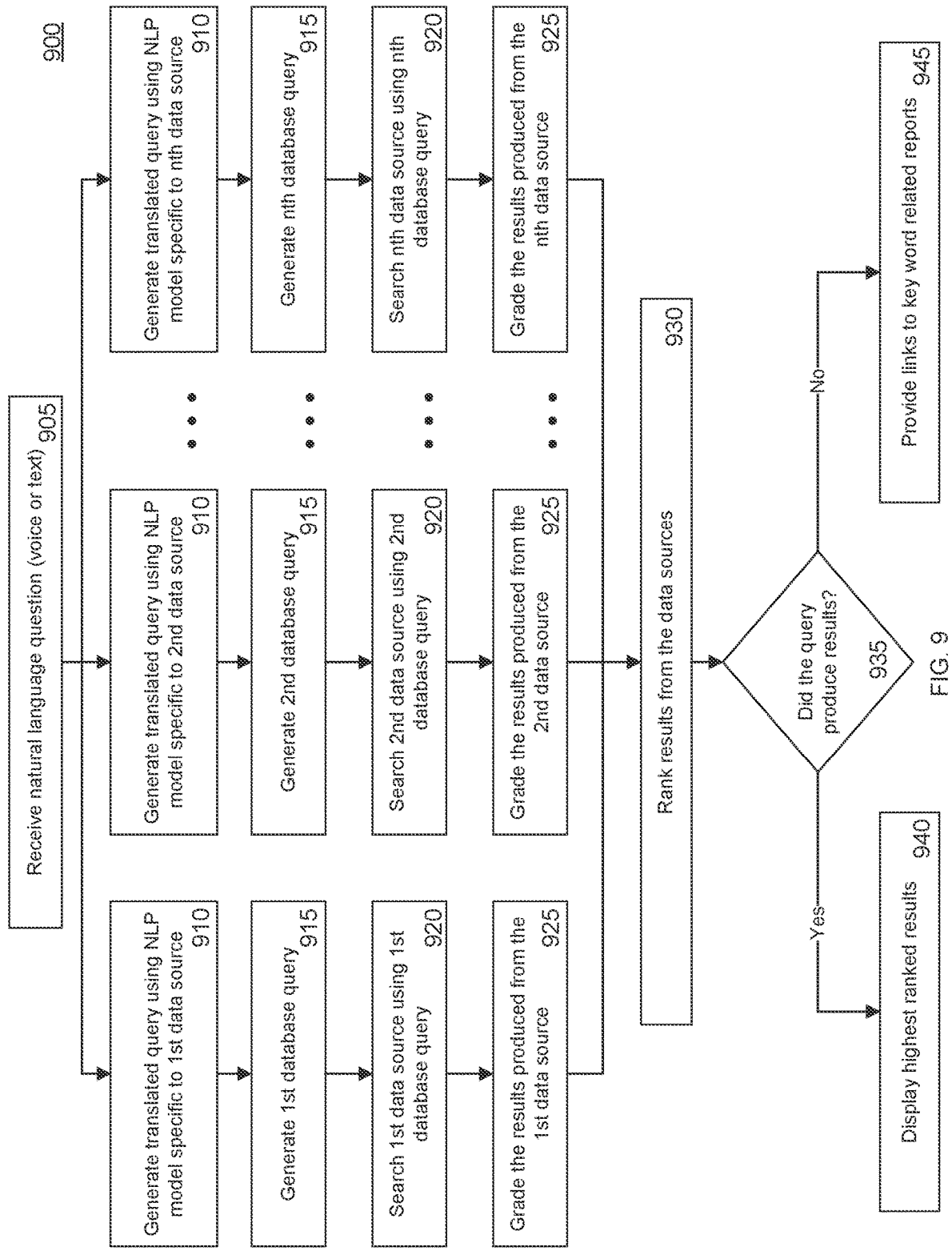
FIG. 9 illustrates method steps of an exemplary process for substantially real-time data retrieval using an adaptive report system that queries and retrieves data from multiple data sources concurrently, according to some embodiments of the present disclosure.

Referring now to FIG. 9, method steps of an exemplary process 900 for substantially real-time data retrieval using an adaptive report system that queries and retrieves data from multiple data sources concurrently are illustrated. At 905, at least one common or natural language query may be received in the form of at least one of: a voice or audio input or a textual input. In some aspects, the received natural language query may involve referring to or searching a plurality of data sources, such as, by way of example and not limitation, a plurality of databases that may be communicatively coupled, either wirelessly or via one or more wired connections, to the adaptive report system. In some embodiments, at 910, the received natural language query may be converted into a plurality of translated queries, wherein each translated query may at least partially comprise one of a plurality of industrial or corporate languages and may be generated by one of a plurality of NLP models, wherein each NLP model may be implemented by an NLP that may be associated with and configured for use with each specific data source that may be referenced or searched by the adaptive report system in attempt to respond to the received natural language query.

In some implementations, at 915, one or more corrections or modifications may be performed on each translated query to clean it up, enhance its clarity or accuracy, or at least partially convert it to an SQL format, and thereby generate a plurality of database queries corresponding to the plurality of translated queries. In some embodiments, the corrections or modifications applied to generate the database queries may be at least partially implemented by one or more users via at least one user interface, or the corrections or modifications may be identified and implemented in a completely autonomous manner by the adaptive report system. In some implementations, at 920, each data source within, associated with, integrated with, or accessible by the adaptive report system may be searched in a substantially concurrent or contemporaneous manner using one of the plurality of database queries that may be directed thereto. In some aspects, at 925, the query of each data source may retrieve relevant data to produce one or more results that may be compiled to generate one or more reports, wherein the results of each query of each data source query may be graded or evaluated by the adaptive report system.

In some non-limiting exemplary embodiments, the query of one or more data sources may not produce any results. In some implementations, at 930, the query results from each data source may be scored or comparatively ranked relative to the query results obtained from each of the other data sources comprising the plurality of data sources. In some aspects, the ranking may be at least partially based on input from one or more users via at least one user interface or the ranking may be completely determined by the adaptive report system in a substantially autonomous fashion. By way of example and not limitation, the ranking may be at least partially determined based on a relevancy assessment of the results to the received query or a quantity of data successfully obtained to generate the results.

In some embodiments, at 935, it may be determined if any database query produced at least one result. In some implementations, an affirmative determination may cause the process 900 to proceed to 940, while a negative determination may cause the process 900 to proceed to 945. In some aspects, at 940, the adaptive report system may display or otherwise present one or more of the highest ranking queried data source search results to at least one user in the form of at least one report via, for example and not limitation, at least one user interface. In some embodiments, at 945, one or more links or citations may be provided to at least one user via at least one user interface that may direct the user(s) to to one or more previously generated reports associated with one or more key words within the query/queries that was/were used to search the data sources.

Conclusion

A number of embodiments of the present disclosure have been described. While this specification contains many specific implementation details, these should not be construed as limitations on the scope of any disclosures or of what may be claimed, but rather as descriptions of features specific to particular embodiments of the present disclosure.

Certain features that are described in this specification in the context of separate embodiments can also be implemented in combination or in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous. Nevertheless, it will be understood that various modifications may be made without departing from the spirit and scope of the claimed disclosure.

What is claimed is:

1. An adaptive report system, the adaptive report system comprising:
    at least one natural language processor, wherein the at least one natural language processor in configured to convert at least one query into at least one translated query, wherein the at least one translated query initiates the generation of at least one database query and wherein the at least one translated query instructs the at least one database query;
    one or more databases, wherein at least one of the one or more databases comprises data that is relevant to the at least one database query, wherein the at least one database query is directed to the one or more databases, wherein the at least one database query at least partially comprises one or more instructions for at least one of: data management within the one or more databases and data retrieval from the one or more databases; and
    at least one user interface; wherein the at least one user interface is configured to receive the at least one query from the at least one user and present at least one report to the at least one user; wherein the at least one report at least partially comprises at least one result of the at least one database query;
    wherein the at least one result is at least partially based on data retrieved from the at least one database query; wherein the at least one user interface is further configured to present at least one verification of the at least one report to the at least one user and to receive at least one interaction pertaining to the at least one verification from the at least one user; wherein the at least one interaction comprises an affirmation of an accuracy or inaccuracy of the at least one report;
    wherein an affirmation of the accuracy of the at least one report prompts storage of an amount of training data within one or more memory resources communicatively coupled to the adaptive report system; wherein the amount of training data at least partially comprises at least one of: the at least one query, the at least one translated query, the at least one database query, and the at least one report; wherein the amount of training data further comprises one or more associations between the at least one report and at least one of: the at least one query, the at least one translated query, and the at least one database query;
    wherein the amount of training data is used by the at least one natural language processor to convert one or more subsequent queries into at least one of: one or more subsequent translated queries and one or more subsequent database queries.

2. The adaptive report system of claim 1, wherein the at least one database query is configured to be edited by the at least one user via the at least one user interface.

3. The adaptive report system of claim 1, wherein the at least one user interface comprises at least one audio receiving device and at least one voice control component.

4. The adaptive report system of claim 3, wherein the at least one voice control component translates a received audio signal into at least one textual query.

5. The adaptive report system of claim 1, wherein the adaptive report system comprises a plurality of databases and a plurality of natural language processors, wherein each of the plurality of databases is associated with one of the plurality of natural language processors.

6. The adaptive report system of claim 5, wherein each of a plurality of database queries is directed to one of the plurality of databases.

7. A method of real-time data retrieval for an adaptive report system, the method comprising:
receiving at least one query, wherein the at least one query is received from at least one user via at least one user interface;
converting the at least one query into at least one translated query, wherein the conversion is at least partially facilitated by at least one natural language processor, wherein the at least one natural language processor converts the at least one query into the at least one translated query by identifying one or more natural language terms within the at least one query and translating the one or more natural language terms into a corporate language that forms the at least one translated query;
generating at least one database query, wherein the at least one database query at least partially comprises one or more instructions for at least one of: data management and data retrieval, wherein the at least one database query is configured to be edited by the at least one user via the at least one user interface;
retrieving data from one or more databases using the at least one database query;
generating at least one report, wherein the at least one report is at least partially based on data retrieved from the at least one database query;
presenting the at least one report to the at least one user; and
requesting a response to at least one verification from the at least one user;
wherein the at least one verification affirms an accuracy or inaccuracy of the at least one report; wherein a response to the at least one verification that affirms an accuracy of the at least one report prompts storage of an amount of training data within one or more memory resources communicatively coupled to the adaptive report system; wherein the amount of training data at least partially comprises at least one of: the at least one query, the at least one translated query, the at least one database query, and the at least one report; wherein the amount of training data further comprises one or more associations between the at least one report and at least one of: the at least one query, the at least one translated query, and the at least one database query; wherein the amount of training data is used by the at least one natural language processor to convert one or more subsequent queries into at least one of: one or more subsequent translated queries and one or more subsequent database queries.

8. The method of claim 7, wherein the receiving of the at least one query at least partially comprises an audio signal received from the at least one user.

9. The method of claim 7, wherein data is retrieved from a plurality of databases using a plurality of database queries.

10. The method of claim 9, wherein each of the plurality of database queries is generated from one of a plurality of translated queries generated by one of a plurality of natural language processors, wherein each of the plurality of natural language processors is associated with one of the plurality of databases.

11. The method of claim 9, wherein data retrieval from the plurality of databases occurs by retrieving data from each of the plurality of databases sequentially.

12. The method of claim 9, wherein data retrieval from the plurality of databases occurs by retrieving data from all of the plurality of databases concurrently.

13. The method of claim 12, wherein data retrieved from each of the plurality of databases is comparatively ranked relative to data retrieved from all other databases comprising the plurality of databases.

14. The method of claim 7, wherein the amount of training data facilitates generation of a novel report from a novel query.

15. The method of claim 7 wherein the at least one report comprises at least one visualization, wherein a format of the at least one visualization is configured to be altered by the at least one user via the at least one user interface.

* * * * *